(No Model.)
V. HANOTIER & G. HOSTELET.
APPARATUS FOR PRODUCING ACETYLENE GAS.
No. 599,098.                               Patented Feb. 15, 1898.
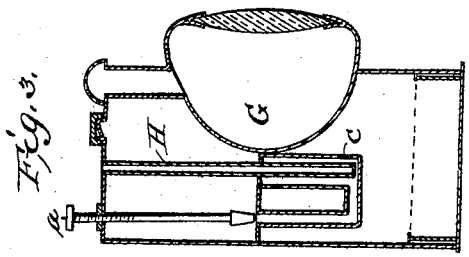
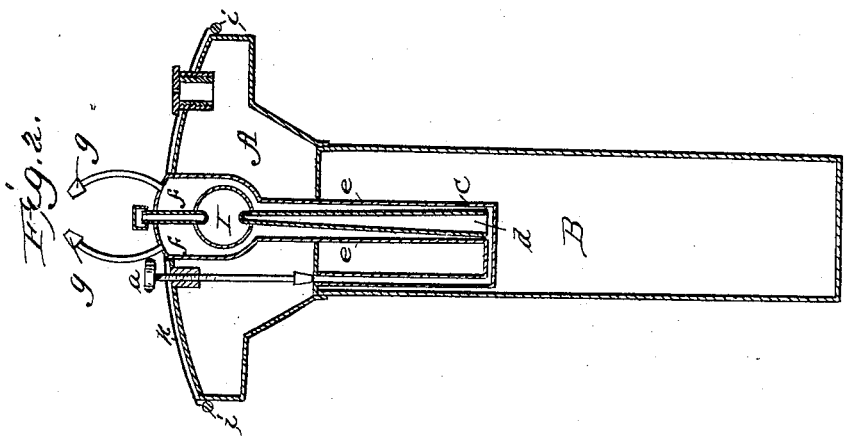
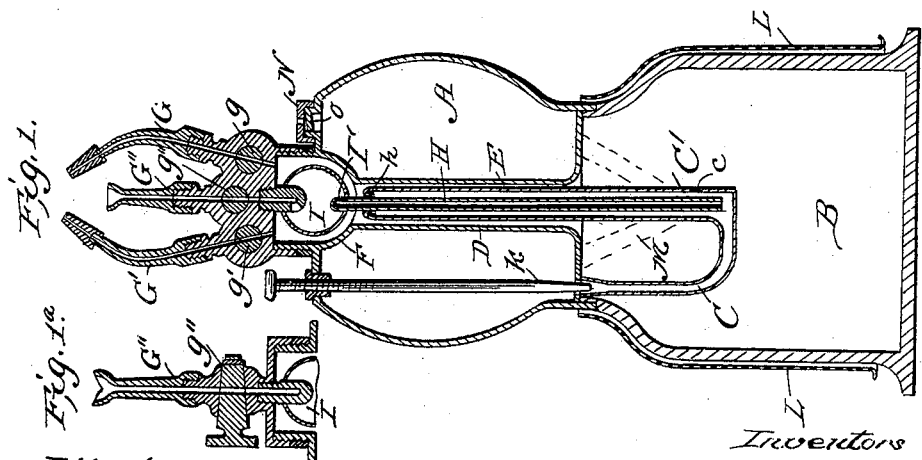
Attest
Walter Donaldson
C. S. Middleton
Inventors
Victor Hanotier
Georges Hostelet
by Richards & Co Attys

United States Patent Office.

VICTOR HANOTIER AND GEORGES HOSTELET, OF CHIMAY, BELGIUM.

APPARATUS FOR PRODUCING ACETYLENE GAS.

SPECIFICATION forming part of Letters Patent No. 599,098, dated February 15, 1898.

Application filed March 3, 1897. Serial No. 625,897. (No model.) Patented in France October 8, 1896, No. 248,232, and October 26, 1896, No. 260,723; in England November 3, 1896, No. 24,558, and December 4, 1896, No. 27,697; in Austria January 11, 1897, No. 47,902; in Hungary January 15, 1897, No. 8,455, and in Russia March 3, 1897, No. 1,433.

*To all whom it may concern:*

Be it known that we, VICTOR HANOTIER and GEORGES HOSTELET, subjects of the King of the Belgians, residing, respectively, at 318 and 315 Rue de Virelles, Chimay, in the Kingdom of Belgium, have invented new and useful Improvements in Apparatus for Producing and Consuming Acetylene Gas, (patented in France, No. 260,723, dated October 26, 1896, and No. 248,232, dated October 8, 1896; in England, No. 24,558, dated November 3, 1896, and No. 27,697, dated December 4, 1896; in Russia, No. 1,433, dated March 3, 1897; in Austria, No. 47,902, dated January 11, 1897, and in Hungary, No. 8,455, dated January 15, 1897,) of which the following is a full, clear, and exact description, reference being had to the accompanying drawings.

The object of this invention is a lamp fit for producing and burning acetylene gas obtained through the reaction of water on carbid of calcium. This new lamp is perfectly secure against explosions, not only on account of the possibility of exactly regulating the quantity of water which comes into contact with the carbid, but because all gas which may be overproduced for some cause or other is instantly and automatically burned at the top of a safety-pipe long before it can issue into the open air or be otherwise obnoxious. Moreover, the appearance of a flame at the top of said safety-pipe shows that the water-feed is not properly regulated and ought to be controlled and corrected. The highest lighting capacity of the lamp is therefore easily secured. In fact, notwithstanding careful regulation of the lamp and nice setting of the feed-valve, overproduction is always possible. The richness of the carbid to be found in trade is very variable. The water, though regularly fed on the carbid, may accumulate in the calcareous residues and, issuing forth all at once, may come in contact with a product which is not yet exhausted. Consequently it is impossible to obtain a constant production of gas by merely regulating the feed-water.

We will now describe the essential parts of the lamp and how they work together in order to obtain the desired effect.

On the annexed drawings, Figure 1 is a sectional elevation of a portable lamp embodying our improvements. Fig. 1$^a$ is a partial vertical section through the safety-burner. Fig. 2 shows a modification intended for carriage-lamps, and Fig. 3 shows another modification intended for bicycle and other lamps burning in the open air.

Referring to Fig. 1, A is a water-receptacle separated from the remainder of the apparatus and communicating with the carbid-receptacle B only through the shorter branch C of a V-shaped tube C C'. The longer branch C' of this siphon is at the same time much wider than the shorter branch C, and its upper end is curved inward, as at $h$. At the lower extremity of the long branch C' and at a certain distance above the bottom of the siphon there is a little opening $c$, and in its upper part where it goes through the water-receptacle A this branch C' is surrounded by a mantle D, an annular space E being left between the branch C' and this mantle, the latter going through the top of the water-receptacle A, where it widens out into a recess F, on the top of which is screwed the burner. This burner has three issues G G' G'', each of them provided with a particular cock $g$ $g'$ $g''$. The two principal burners G and G' are symmetrically disposed to make their flames meet at an angle and form one large flame. The third issue is provided with a Manchester burner of large size, the opening of which is situated below those of the other burners.

A tube H reaches down into the branch C' of the tube, its lower extremity being immersed in the little quantity of water which reaches up to the hole $c$. The upper end of this tube H communicates with a hollow sphere I, lodged inside of the recess F, through the opening I', and this same sphere communicates with the third burner G'', which may be called the "safety-burner."

A valve K, the spindle of which is wormed at the top and screwed into the top of the water-receptacle, fits into the upper opening $a$ of the branch C where this branch opens into the water-receptacle. This receptacle is provided with a wire network L, reaching downward and surrounding the carbid-receptacle B. This wirework protects the hand against the heat of the carbid-receptacle, and when the water-receptacle is screwed off from its seat on the top of the carbid-receptacle the wirework serves as a stand to put the water-receptacle upright on the table. The wire-netting for this purpose is removed from the carbid-receptacle. Two conically-shaped wire-gauzes M are fitted onto the bottom of the water-receptacle. The baskets thus formed may be used as receptacles for lime and limonite in order to dry and purify the gas before it is used and to intercept tar and other impurities.

The water is put into the receptacle A through a hole at the top. This hole is protected by a cap N, having a small hole drilled into it. A little disk of leather or india-rubber is fixed inside in order to keep the dust out, although it will let the air in.

The device works as follows: The water-receptacle being unscrewed and put vertically on the table, where it is supported by the wirework L, the carbid is introduced into the receptacle B. The receptacle A being again screwed into its seat and the valve K being screwed down into the opening $a$, so as to close it completely, water is poured into the receptacle A, the shape of which is such that the pressure of the water is always superior to the highest gas-pressure required for the burners, to which is added the pressure necessary to make the safety-burner work. Of course the water must never completely leave the receptacle A, a certain quantity always remaining in this receptacle. The valve K being regulated, the water in the tube C C' will not rise above the lower edge of the hole $c$ and will fall on the carbid drop by drop as long as the gas-pressure is normal. The three cocks $g$ $g'$ $g''$ are now turned on and the two burners G and G' are lighted, the gas coming to them through the annular space E. The third burner G'' will not burn, the sphere I with which it communicates having no other communication with the receptacle B than through the tube H, and the lower end of this tube being open and immersed in the water of the V-shaped tube C C'. The gas-pressure acting on the surface of this water through the hole $c$ the liquid will rise in the safety-tube until the height of the column is balanced by the pressure of the gas. If for one reason or another the pressure of the gas should increase, the water contained in the V-shaped tube would rise into the safety-tube and the feed through the hole $c$ would momentarily cease until equilibrium was restored. If the pressure of the gas should increase to such an extent that the lower end of the safety-tube were to emerge from the water, the gas would enter the tube, and after gurgling through the water therein contained (part of which would have been driven into the hollow sphere I) would very rapidly be burned through the burner G'', which, as has been said above, has a large issue. By such means equilibrium would be rapidly restored. Moreover, the appearance of the flame on the top of the safety-burner would show that the feed-valve K ought to be regulated more nicely. As the gas which has been overproduced is burning away the water which has come into the sphere I will go down again and the safety-tube H will again work as a regulator for the pressure of the gas. If, on the other hand, the pressure of the gas were to decrease, the water out of the safety-tube would come down, increasing the quantity contained in the siphon, and the flow of water through the hole $c$ would equally be increased. It will easily be understood that the length of that part of the tube H which dips into the water of the tube C C' must be proportioned to the pressure at which the lamp is expected to burn.

If the lamp were to be upset, (a very rare case, considering the wide base of the same,) only very little or no water at all could be spilled into the carbid-receptacle on account of the upper edge of the branch C', which, as has been stated above, is curved toward the inside at $h$. This edge will prevent the water from flowing into the annular space E and thence into the carbid-receptacle. There will be also little likelihood of any explosion due to the water escaping from the opening $c$, as the lamp, if upset, is as likely to lie with this opening uppermost, and if not there will be no more water pass through this opening than when the lamp is working normally.

If no danger or nuisance could come from the overproduced gas escaping into the air, the burner, the construction of which is rather expensive, may be simplified by doing away with the extra burner G'' and the corresponding cock, the overproduced gas escaping into the open air. An example of such modification is illustrated on Fig. 2, where the lamp is used as a carriage-lamp. The part of the lamp below the lower reflector being the only one differing from other carriage-lamps, this part alone is illustrated on the drawings. The lower reflector is shown at $k$ $k$. The receptacle A contains the water poured into it through the opening $m$, closed up by the threaded lid $h$, a hole in this lid allowing the outer air to get into the receptacle. The valve $a$, the shape of which is such that it can be removed from the apparatus, allows the water to be fed with great nicety, this water falling through the opening $c$ on the carbid contained in the lower receptacle B. The safety-tube I in the present case has a conical shape in order to prevent to a certain extent the water from being projected out of the tubing by the frequent trepidations of the carriage. The gas follows the course $e$ $f$ $g$ and burns at $g$ through the double burner. The section of the opening of these burners is as narrow as possible in order to have a complete combustion. The carbid is contained in a long tube B, secured onto the bottom of the water-receptacle A. The candle-tube of the ordinary carriage-lamp may be used for this purpose.

If thought advisable, the siphon may be wrapped up in a cotton wick in order that the water may drop down regularly and continuously on the carbid.

The lamp is fixed to the lantern by hinges soldered onto the lower reflector and to the water-receptacle. Two rods $i$ hold the parts together and they are easily taken to pieces.

Another modification is illustrated on Fig. 3, where the lamp is used as a bicycle-lamp. There is but a single burner in the chamber G in this instance, and the overproduced gas, if there is any, escapes into the air through the safety-tube H, which is open at the top.

We claim—

1. In acetylene-gas lamps the combination with the water-receptacle A and the carbid-receptacle B, of a siphon C C' with unequal branches, the shorter branch C opening into the water-receptacle where it is provided with a regulating-valve K, the longer branch C' communicating with the burner or burners and having a hole $c$ at a certain distance above the curve of the siphon; and a safety-tube H with its lower end immersed in the water below the hole $c$ and its upper end communicating with a safety-burner or with the outer air.

2. In combination the water-receptacle A, the carbid-receptacle B, the siphon C C' with unequal branches and a hole $c$ at a certain distance above the curve of the siphon, the regulating-valve K, and a safety-tube H contained in the long branch of the siphon and having its lower end immersed in the water contained in this branch and its upper end provided with a hollow sphere I and a safety-burner, or communicating with the outer air.

In witness whereof we have hereunto set our hands in presence of two witnesses.

VICTOR HANOTIER.
    G. HOSTELET.

Witnesses:
 DEODAT LIEBRECHT,
 AUGUSTE DE BENSTER.